(12) United States Patent
Narumi et al.

(10) Patent No.: US 7,902,775 B2
(45) Date of Patent: Mar. 8, 2011

(54) MOTOR DRIVING DEVICE

(75) Inventors: Satoshi Narumi, Hyogo (JP); Hiroshi Murakami, Hyogo (JP); Toshiya Suzuki, Hyogo (JP)

(73) Assignee: Renesas Electronics Corporation, Kanagawa (JP)

( * ) Notice: Subject to any disclaimer, the term of this patent is extended or adjusted under 35 U.S.C. 154(b) by 381 days.

(21) Appl. No.: 12/194,904

(22) Filed: Aug. 20, 2008

(65) Prior Publication Data

US 2009/0058336 A1  Mar. 5, 2009

(30) Foreign Application Priority Data

Aug. 29, 2007  (JP) ................................ 2007-222568

(51) Int. Cl.
*H02P 6/18* (2006.01)
(52) U.S. Cl. .......... 318/400.06; 318/400.04; 318/400.09; 318/400.11; 318/400.32; 360/75
(58) Field of Classification Search ............. 318/400.04, 318/440.6, 400.09, 400.11, 400.32; 360/75
See application file for complete search history.

(56) References Cited

U.S. PATENT DOCUMENTS

| | | | | |
|---|---|---|---|---|
| 4,973,896 A * | 11/1990 | Shiga et al. | ...................... | 322/28 |
| 5,631,999 A * | 5/1997 | Dinsmore | ...................... | 388/805 |
| 6,153,989 A * | 11/2000 | Kardash et al. | .......... | 318/400.09 |
| 7,054,089 B2 * | 5/2006 | Kokami | ...................... | 360/73.03 |
| 7,071,640 B2 * | 7/2006 | Kurosawa et al. | ........ | 318/400.04 |
| 7,158,332 B2 * | 1/2007 | Kokami | .......................... | 360/75 |
| 7,230,785 B2 * | 6/2007 | Itagaki et al. | ............... | 360/73.03 |
| 7,411,365 B2 * | 8/2008 | Kurosawa et al. | ........ | 318/400.32 |
| 7,626,777 B2 * | 12/2009 | Aemireddy et al. | ............ | 360/25 |
| 7,750,586 B2 * | 7/2010 | Kurosawa et al. | ........ | 318/400.32 |
| 2004/0080293 A1 * | 4/2004 | Kurosawa et al. | ............. | 318/459 |
| 2004/0100722 A1 * | 5/2004 | Kokami | .......................... | 360/75 |
| 2006/0044664 A1 * | 3/2006 | Itagaki et al. | ............... | 360/73.03 |
| 2006/0072237 A1 * | 4/2006 | Kokami | .......................... | 360/75 |
| 2006/0082336 A1 * | 4/2006 | Kurosawa et al. | ............. | 318/254 |
| 2007/0070534 A1 * | 3/2007 | Aemireddy et al. | ............ | 360/25 |
| 2008/0297082 A1 * | 12/2008 | Kurosawa et al. | ........ | 318/400.11 |

FOREIGN PATENT DOCUMENTS

JP   2006-217681   8/2006

* cited by examiner

*Primary Examiner* — Paul Ip
(74) *Attorney, Agent, or Firm* — McDermott Will & Emery LLP (57) ABSTRACT

An object of the present invention is to provide a motor driving device capable of outputting an accurate rotation signal while preventing a false detection of B-EMF in a position detecting comparator. The motor driving device includes an output circuit, filter circuit, comparison circuit, current zero ampere detecting circuit, position detecting circuit, sensorless drive arithmetic operation circuit, noise reduction current waveform generating circuit, signal synthesizing circuit, and output transistor control circuit, the comparison circuit including a comparator, polarity switching portion connected to a + terminal and − terminal of the comparator and signal switching portion, the comparator being structured to be able to set and release an offset having a predetermined voltage value set preliminarily.

4 Claims, 6 Drawing Sheets

MOTOR DRIVING DEVICE

BACKGROUND OF THE INVENTION

1. Field of the Invention

The present invention relates to a motor driving device and more particularly to a motor driving device for driving a three phase brushless motor without using a hall sensor.

2. Description of the Background Art

Conventionally, there has been known a motor driving device which drives the three-phase brushless motor without using the hall sensor. This motor driving device detects a rotation position of the rotor using induced voltage (B-EMF: back electromotive force) generated in a stator coil by a rotation of the rotor instead of detecting the rotation position of the rotor by means of the hall sensor and applies a three-phase PWM voltage in which the phase is shifted every 120 degrees based on the detection result.

In such a motor driving device, as described in Japanese Patent Application Laid-Open No. 2006-217681, comparison of each of the induced voltages of U phase, V phase and W phase with a center tap voltage is carried out by a comparator (position detecting comparator) and the rotation position of the rotor is detected based on its comparison result signal.

The motor driving device has a case where a right position cannot be detected at a low speed rotation of 2300 rpm or less since a voltage component due to a current ripple of PWM drive is applied to the B-EMF. Thus, generally, the voltage component is removed by passing the B-EMF through a CR filter.

However, a following phenomenon occurs. That is, a voltage ripple of several mV is left in a voltage after passing the B-EMF through the CR filter, so that a position detection comparator responds to the voltage ripple and outputs the same signal as in a case where the B-EMF is detected. Consequently, it is mistakenly detected that the motor is rotated at high speeds although the motor is rotated at low speeds so as to output a false rotation signal (FG). This phenomenon is referred to as self-oscillation.

If the self-oscillation occurs, not only the motor cannot be stopped properly but also the false rotation signal is applied to a system having the motor driving device. Consequently, there is a possibility that an unexpected phenomenon may occur in that system.

SUMMARY OF THE INVENTION

An object of the present is to provide a motor driving device capable of outputting an accurate rotation signal while preventing a false detection of B-EMF in a position detecting comparator.

An aspect of the motor driving device of the present invention includes an output circuit, filter circuit, comparison circuit, position detecting circuit, sensorless drive arithmetic operation circuit, noise reduction current waveform generating circuit, signal synthesizing circuit and output transistor control circuit. The comparison circuit includes a comparator, a polarity switching portion connected to a + (plus) terminal and − (minus) terminal of the comparator and a signal switching portion, and the comparator being capable of setting and releasing an offset having a predetermined voltage value set preliminarily.

In the motor driving device, by setting the offset in the comparator, the comparator is prevented from detecting a voltage ripple after PWM drive voltage is passed through a CR filter as a B-EMF voltage at the time of a rotation. Consequently, this prevents a false rotation signal from being outputted by mistakenly detecting that the three-phase brushless motor is rotating at a higher revolution number than the actual revolution number despite the actual low revolution number of the three-phase brush less motor.

These and other objects, features, aspects and advantages of the present invention will become more apparent from the following detailed description of the present invention when taken in conjunction with the accompanying drawings.

DESCRIPTION OF THE PREFERRED EMBODIMENTS

Embodiments

Structure of Motor Driving Device

Figure 1:
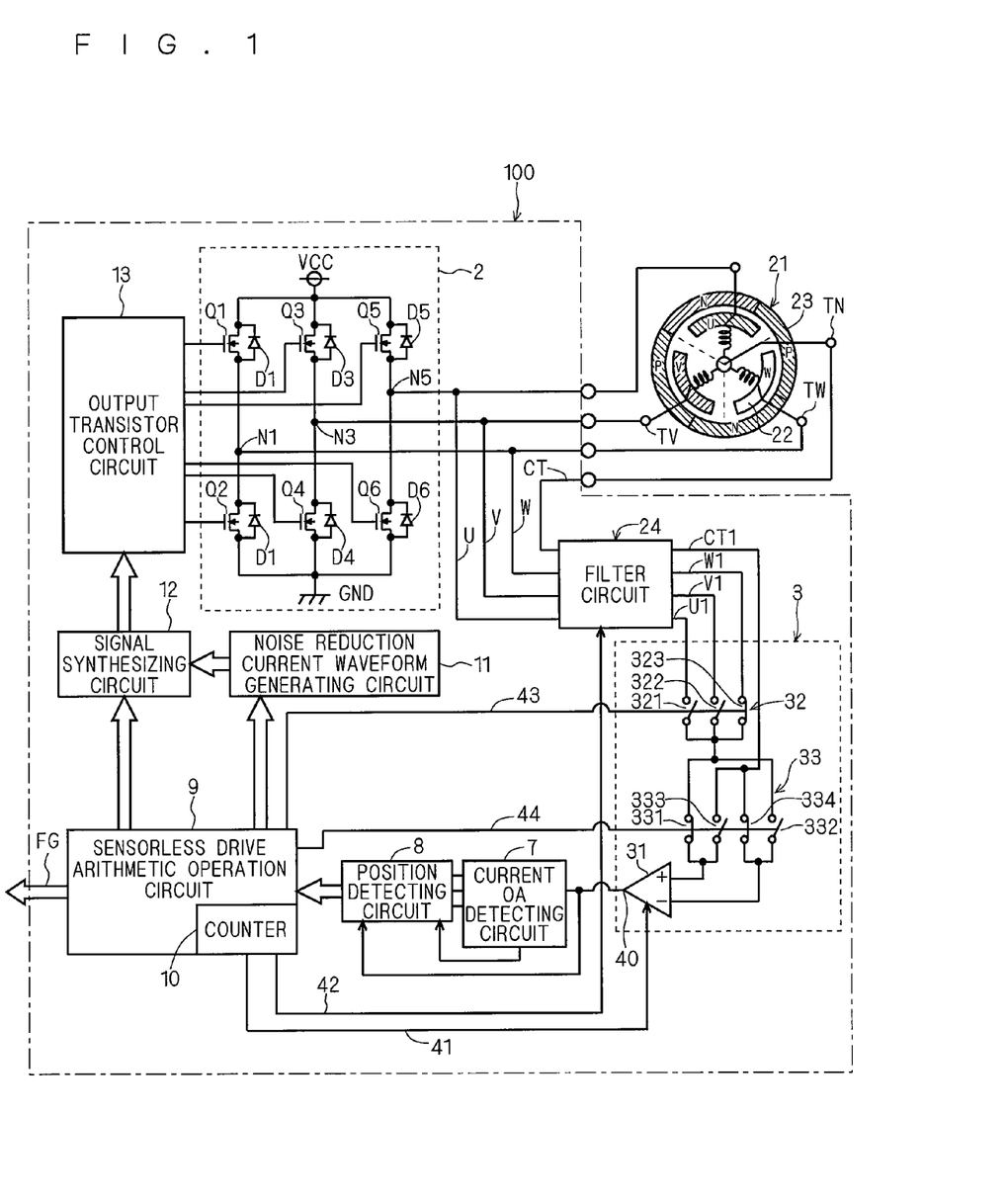
FIG. 1 is a block diagram showing the structure of a motor driving device according to an embodiment of the present invention.

FIG. 1 is a block diagram showing the structure of a motor driving device 100 according to an embodiment of the present invention. As shown in FIG. 1, the motor driving device 100 includes an output circuit 2, a filter circuit 24, a comparison circuit 3 (voltage comparing portion), a current zero ampere (0 A) detecting circuit 7, a position detecting circuit 8, a sensorless driving arithmetic operation circuit 9 (drive signal generating circuit), a noise reduction current waveform generating circuit 11, a signal synthesizing circuit 12 and an output transistor control circuit 13 and drives a three-phase brushless motor 21 without using a hall sensor. Note that the motor driving device 100 is formed as a single integrated circuit (IC).

The three-phase brushless motor 21 includes a stator 22 and a rotor 23 provided rotatably around the stator 22 and the stator 22 includes U phase, V phase and W phase coils connected in a Y connection. A first end of each of the U phase, V phase and W phase coils is connected to coil terminals TU, TV and TW of the U phase, V phase and W phase coils while second ends thereof are connected to the center tap terminal TN. In the rotor 23, a plurality (four poles in the Figure) of N poles and P poles are disposed alternately along a rotation direction.

When three-phase PWM voltage in which the phase is shifted every 120 degrees is applied to the U phase, V phase and W phase coils in the three-phase brushless motor 21, rotating magnetic field is generated so that the rotor 23 is rotated following the rotating magnetic field. Note that the three-phase brushless motor 21 is used as a spindle motor for rotating a digital versatile disc (DVD) of a personal computer or a compact disc (CD) at high speeds.

Next, each component will be described.

An output circuit 2 includes N-channel type MOS transistors Q1 to Q6 and diodes D1 to D6. The MOS transistors Q1 and Q2, Q3 and Q4, Q5 and Q6 make a pair and are connected in series between a power source voltage (VCC) line and ground (GND).

Then, a node N1 between the MOS transistors Q1 and Q2, a node N3 between the MOS transistors Q3 and Q4 and a node 5 between the MOS transistors Q5 and Q6 are connected to the coil terminals TU, TV and TW of the three-phase brushless motor 21.

The diodes D1, D3 and D5 are connected between the nodes N1, N3 and N5 and the VCC line such that they are in inverse parallel to the MOS transistors Q1, Q3 and Q5. The diodes D2, D4, and D6 are connected between the GND line and the nodes N1, N3, N5 such that they are in inverse parallel to the MOS transistors Q2, Q4 and Q6. Note that parasitic diodes which are parasitic on each MOS transistor may be used instead of the diodes D1 to D6.

DC voltage VCC can be converted to three-phase PWM voltage by turning ON/OFF the MOS transistors Q1 to Q6 at a predetermined timing. Note that it may be structured such that a P-channel type MOS transistor is used instead of the N-channel type MOS transistor so as to supply a signal or an inversion signal, which has a phase reverse to that of a signal to be supplied to a gate of the N-channel type MOS transistor, to a gate of the P-channel type MOS transistor.

The filter circuit 24 is connected to the coil terminals TU, TV and TW of the three-phase brushless motor 21 and the center tap terminal TN. Voltage components resulting from current ripple contained in back electromotive forces U, V, and W (coil terminal voltage) respectively outputted from the coil terminals TU, TV and TW and the center tap voltage CT are removed so as to output the back electromotive forces U1, V1, and W1 after filtering and the center tap voltage CT1 after filtering.

That is, in the three-phase brushless motor 21, inductance component might change in the stator 22 having a flaw such as pinhole in its wound wire so that balance of the back electromotive force (B-EMF) generated in each phase based on CT standard might be shifted. However, by integrating the coil terminal voltage of the three-phase brushless motor 21 by means of a CR filter, back electromotive force (B-EMF) having no pinhole can be detected.

Figure 2:
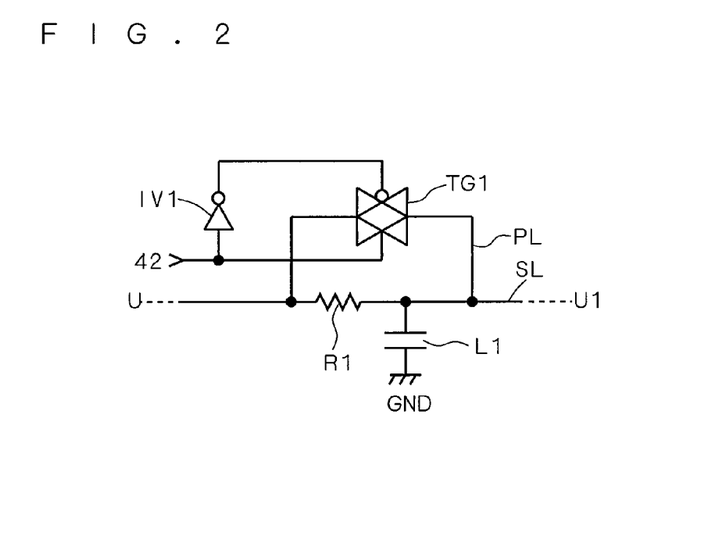
FIG. 2 is a diagram showing the structure of a filter circuit.

FIG. 2 shows the structure of the filter circuit 24.

As shown in FIG. 2, the filter circuit 24 includes a low pass filter constituted of a CR filter including a resistor element R1 interposed in a signal line SL and a capacitor element L1 interposed between a signal line SL and GND, and a transmission gate TG1 interposed in a bypass line PL which bypasses the low pass filter. FIG. 2 exemplifies a low pass filter and transmission gate TG1 provided on a U phase signal line.

An inversion signal of a control signal 42 is given to an inversion gate of the transmission gate TG1 through an inverter IV1 and a control signal 42 is given to a gate of the transmission gate TG1. When the transmission gate TG1 is turned ON by the control signal 42, a signal in the signal line SL passes through the bypass line PL so that the low pass filter is substantially turned OFF. Here, the control signal 42 is a signal which is given from a counter 10 incorporated in the sensorless drive arithmetic operation circuit 9 described later.

Although a N-channel type MOS transistor or P-channel type MOS transistor may be used as the bypass line PL instead of the transmission gate TG1, if the transmission gate is used, advantageously, the input range can be increased.

As the aforementioned filter circuit 24, an example constructed of a CR filter has been exemplified. The low pass filter is not restricted to the CR filter as long as the low pass filter can remove harmonic components.

The comparison circuit 3 includes a comparator 31, a polarity switching portion 33 connected to + terminal and − terminal of the comparator and a signal switching portion 32 which alternately switches the back electromotive forces U1, V1, and W1 or back electromotive forces U1, V1, and W1 after filtering and give the signal to the polarity switching portion 33.

The signal switching portion 32 includes a switch 321 which receives back electromotive force U or back electromotive force U1 after filtering, a switch 322 which receives back electromotive force V or back electromotive force V1 after filtering and a switch 323 which receives back electromotive force W or back electromotive force W1 after filtering. These switches are controlled so that only any one of the switches 321 to 323 is turned ON by the control signal 43 (second control signal) given from the sensorless drive arithmetic operation circuit 9 described later.

The polarity switching portion 33 includes switches 331 and 332 which switch a signal selected by the signal switching portion 32 to provide the switched signal to the + terminal or − terminal of the comparator and switches 333 and 334 which switch the center tap voltage CT or the center tap voltage CT1 after filtering to provide the swathed center tap voltage CT or the center tap voltage CT1 to the + terminal or − terminal of the comparator 31. The switches 331 and 333 are connected to the + terminal of the comparator 31 and the switches 332 and 334 are connected to the − terminal of the comparator 31. Then, the pair of the switches 332 and 333 and the pair of the switches 331 and 334 are controlled to operate complementarily by a control signal 44 (first control signal) given from the sensorless drive arithmetic operation circuit 9.

The comparator 31 compares any one of the back electromotive forces U, V, W with the center tap voltage CT or compares any one of the back electromotive forces U1, V1, and W1 after filtering with the center tap voltage CT1 after filtering. For example, if the back electromotive force U1 after filtering is higher than the center tap voltage CT1 after filtering, the B-EMF detection signal 40 outputted by the comparator 31 is "H" level and if the back electromotive force U1 after filtering is lower than the center tap voltage CT1 after filtering, the B-EMF detection signal 40 is "L" level.

When the back electromotive forces U1, V1, and W1 is given to the − terminal of the comparator 31 by the polarity switching portion 33, for example, if the back electromotive force U1 after filtering is lower than the center tap CT1 after filtering, the B-EMF detection signal 40 outputted by the comparator 31 is "H" level and if the back electromotive force U1 after filtering is higher than the center tap voltage CT1 after filtering, the B-EMF detection signal 40 is "L" level.

The comparator 31 is structured so that setting and release of an offset of a predetermined voltage value set preliminarily are enabled. The setting and release of the offset are controlled by an offset signal 41 given from the counter 10 incorporated in the sensorless drive arithmetic operation circuit 9.

A current zero ampere detection circuit 7 detects that coil current of position detection phase reaches 0 A based on the B-EMF detection signal 40. The position detection phase refers to a phase whose position is to be detected, of the U phase, V phase and W phase, and it is changed in order of the U phase, V phase and W phase.

When a current zero ampere detection circuit 7 detects a fact that the coil current of the position detection phase reaches 0 A, accordingly, the position detecting circuit 8 detects a zero cross point of any voltage of the terminals TU, TV and TW of the position detection phase based on the B-EMF detection signal 40 and outputs a position detection signal indicating a detection result and provides the resultant signal to the sensorless drive arithmetic operation circuit 9.

The sensorless drive arithmetic operation circuit 9 increments, initializes, sets and resets the incorporated counter 10 while generating the PWM signal based on a position detection signal from the position detecting circuit 8 and controlling the PWM signal to shut down the current of the position detection phase at an appropriate timing.

The sensorless drive arithmetic operation circuit 9 generates a pulse-like rotation signal FG based on the position detection signal from the position detecting circuit 8 and outputs the pulse-like rotation signal FG out of the system. Each time when the sensorless drive arithmetic operation circuit 9 detects an edge of this rotation signal FG, the sensorless drive arithmetic operation circuit 9 switches the logic of the control signal 44, switches the polarity of the comparator 31 and successively switches the switches 321 to 323 of the signal switching portion 32 at a timing after the edge of the rotation signal FG is detected.

The counter 10 incorporated in the sensorless drive arithmetic operation circuit 9 is used as a counter of the current zero ampere detecting circuit 7, the noise reduction current waveform generating circuit 11 and the signal synthesizing circuit 12 commonly, and generates the offset signal 41 for controlling the setting and release of the offset of the comparator 31 and the control signal 42 for ON/OFF control of the filter circuit 24.

The noise reduction current waveform generating circuit 11 generates a current waveform for reducing noise of the three-phase brushless motor 21 synchronously with the PWM signal generated by the sensorless drive arithmetic operation circuit 9.

The signal synthesizing circuit 12 synthesizes a PWM signal generated by the sensorless drive arithmetic operation circuit 9 and current waveform generated by the noise reduction current waveform generating circuit 11.

The output transistor control circuit 13 controls ON/OFF of the transistors Q1 to Q6 of the output circuit 2 following an output signal of the signal synthesizing circuit 12. Consequently, three-phase PWM voltage is supplied to the three-phase brushless motor 21 from the output circuit 2 so as to rotate the rotor 23.

<Operation of the Motor Driving Device>

Next, a detection operation for motor revolution number in the motor driving device 100 will be described using the flow chart shown in FIG. 3 and the waveform diagram shown in FIG. 4 with reference to FIG. 1.

Hereinafter, an operation of the three-phase brushless motor 21 will be described step by step. That is, the operation of the three-phase brushless motor 21 from a state where the three-phase brushless motor 21 is rotating at high speeds, for example, exceeding 2300 rpm (called sample hold mode) to a state where the three-phase brushless motor 21 is decelerated quickly and stopped.

Figure 3:
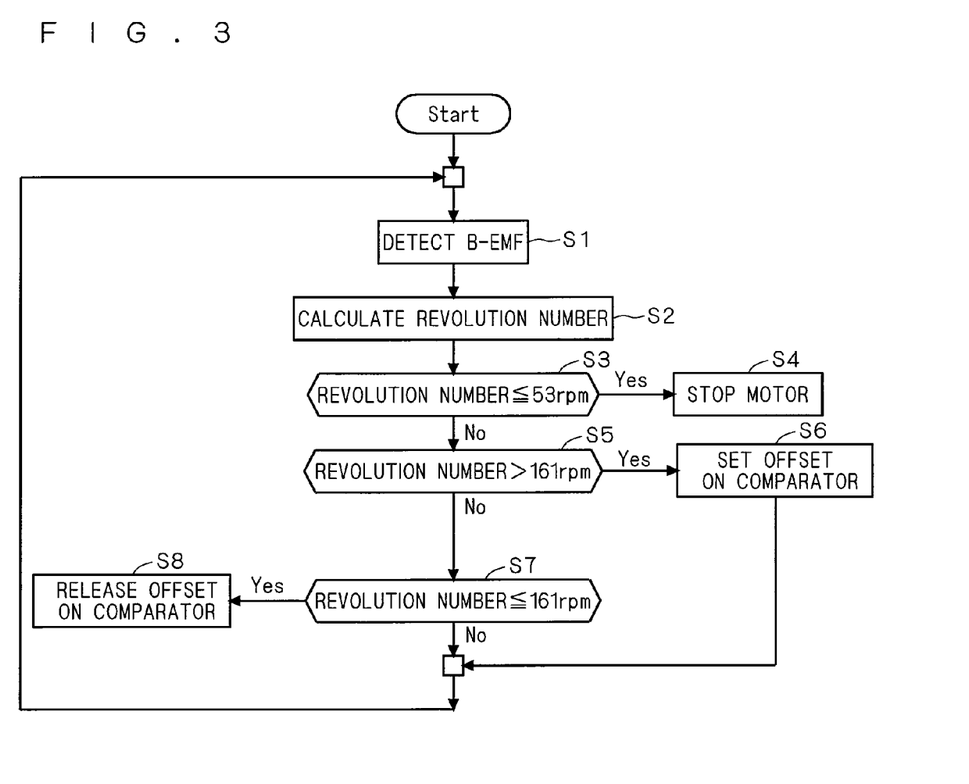
FIG. 3 is a flow chart for explaining a detection operation of a motor revolution number in the motor driving device according to the embodiment of the present invention.

First, in step S1 of FIG. 3, the comparator 31 compares the back electromotive forces U, V, and W with the center tap voltage CT or compares the back electromotive forces U1, V1, and W1 after filtering with the center tap voltage C1 and then outputs the B-EMF detection signal 40.

That is, at high speed rotation exceeding 2300 rpm, the B-EMF is sufficiently high and an influence of voltage component due to current ripple of the PWM drive is small. Thus, the B-EMF does not need to be passed through the CR filter and the filter circuit 24 is kept OFF by the control signal 42. The comparator 31 compares the back electromotive forces U, V, W with the center tap voltage CT and outputs the B-EMF detection signal 40. On the other hand, if the revolution number is 2300 rpm or less, the B-EMF is lowered so that the influence of the voltage component by current ripple of the PWM drive appears. Thus, the B-EMF needs to be passed through the CR filter and then the filter circuit 24 is turned ON. The comparator 31 compares the back electromotive forces U1, V1, and W1 after filtering with the center tap voltage CT1 after filtering.

The sensorless drive arithmetic operation circuit 9 calculates a revolution number of the three phase brushless motor 21 based on the B-EMF detection signal 40 (step S2) and determines whether or not a calculated revolution number is 53 rpm or less (step S3).

Figure 4:
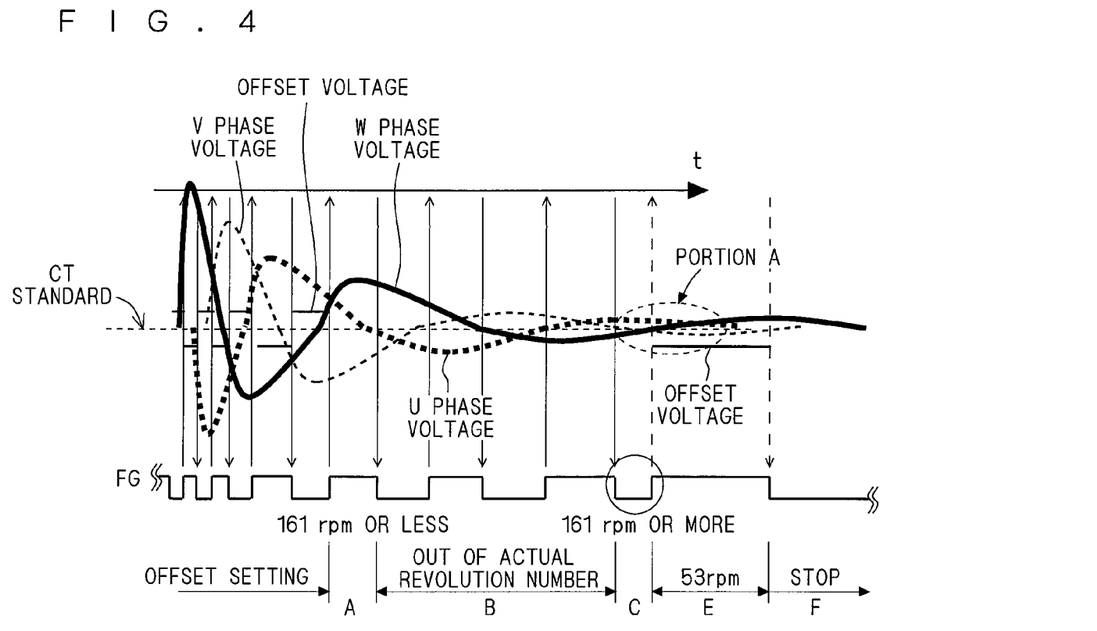
FIG. 4 is a diagram showing B-EMF waveform after filtering and corresponding rotation signal when offset is set.

FIG. 4 shows a waveform (B-EMF waveform) of the back electromotive forces U1, V1, and W1 after filtering and a rotation signal FG corresponding to that waveform in a case where the revolution number is other than an actual revolution number. This figure indicates that if the revolution number is the actual revolution number or less and exceeding 161 rpm, the pulse width of the rotation signal FG is small and the amplitude of the B-EMF waveform is sufficiently high. Further, FIG. 4 indicates the center tap voltage CT1 after filtering as the CT standard and shows an offset voltage set by the comparator 31.

If it is determined that the revolution number is 53 rpm or less in step S3, the rotation of the three-phase brushless motor 21 is stopped in step S4. On the other hand, if it is determined that the revolution number exceeds 53 rpm in step S3, a determination is made on whether or not the revolution number exceeds 161 rpm in step S5. Then, if it is determined that the revolution number exceeds 161 rpm, the comparator sets the offset (step S6).

The setting of the offset mentioned here is an operation of comparing based on a voltage shifted to a higher side in absolute value than the CT standard if the comparison voltage of the comparator 31 is the CT standard. When the voltage is shifted from the CT standard, a position which crosses the B-EMF waveform is changed and depending on the height of the amplitude of the B-EMF waveform, the B-EMF detection signal 40 is changed, so that finally, the waveform of the rotation signal FG is changed.

The offset voltage is set so that the PWM voltage is larger than that of the voltage ripple after the voltage ripple is smoothed by the CR filter. If it is assumed that the amplitude level of the B-EMF waveform is several V when the three-phase brushless motor 21 is rotating at high speeds exceeding 2300 rpm, for example, the offset voltage is set to about 50 mV.

The offset voltage is set symmetrical vertically with respect to the B-EMF waveform centering around the CT standard by switching the logic of the control signal 44 given to the polarity switching portion 33 of the comparison circuit 3. The logic of the control signal 44 is switched each time when the edge of the rotation signal FG is detected. Note that the polarity of the offset voltage is set as polarity of an opposite side to a rise direction of the detected edge.

As described above, the offset voltage is much smaller as compared with the amplitude level of the B-EMF waveform in a case where the motor is rotating at revolution number exceeding the actual revolution number. Thus, even if the offset is set, the rate of a change of the B-EMF detection signal 40 is small and a position detection error due to the setting of the offset is not a problem.

After the offset is set, the operation of step S1 is repeated. However, in this case, the comparator 31 compares not the center tap voltage CT but the center tap voltage CT to which the offset voltage is equivalently applied with the B-EMF and outputs the B-EMF detection signal 40.

The sensorless drive arithmetic operation circuit 9 calculates a revolution number of the three phase brushless motor 21 based on the B-EMF detection signal 40 (step S2) and determines whether or not the calculated revolution number is 53 rpm or less (step S3).

Now if it is assumed that the revolution number of the three-phase brushless motor 21 exists in area A of FIG. 4, that is, an area of 161 rpm or less, or area B, that is, out of the actual revolution number, it is determined that the revolution number exceeds 53 rpm. Thus, the procedure proceeds to step S5, in which a determination is made on whether or not the revolution number exceeds 161 rpm.

Since the revolution number does not exceed 161 rpm in the area A or area B, the procedure proceeds to step S7, in which a determination is made on whether or not the revolution number is 161 rpm or less. Since the revolution number is 161 rpm or less in the area A or area B, thus, the offset set in the comparator 31 is released (step S8). The reason is that when the revolution number is 161 rpm or less, the amplitude level of the B-EMF waveform drops to about several hundreds mV, so that the setting of the offset increases the position detection error.

After the offset of the comparator is released, the operation of step S1 is repeated. In this case, the comparator 31 compares the center tap voltage CT with the B-EMF and outputs the B-EMF detection signal 40.

The sensorless drive arithmetic operation circuit 9 calculates a revolution number of the three-phase brushless motor 21 based on the B-EMF detection signal 40 (step S2) and determines whether or not the calculated revolution number is 53 rpm or less (step S3).

If it is assumed that the revolution number of the three-phase brushless motor 21 is in area C of FIG. 4, that is, area of 161 rpm or more, it is determined that the revolution number exceeds 53 rpm. Thus, the procedure proceeds to step S5, in which a determination is made on whether or not the revolution number exceeds 161 rpm.

Since the revolution number is 161 rpm or more in the area C, if the revolution number exceeds 161 rpm, the procedure proceeds to step S6, in which the offset of the comparator 31 is set (step S6).

A fact that the revolution number exceeds 161 rpm in the area C although it is 161 rpm or less in the area A is considered as follows. That is, the operation of the three-phase brushless motor 21 directed to be stopped is not normal and the comparator 31 responds to a voltage ripple left in the B-EMF after the B-EMF is passed through the CR filter despite the actual low revolution number, so that it is mistakenly detected that the three-phase brushless motor 21 is rotating at higher revolution number than the actual revolution number.

However, after the offset is set in the comparator 31, the voltage ripple which does not reach the offset voltage is not detected by the comparator 31 and further, in area E in which the actual revolution number is near 53 rpm, the B-EMF waveform is not detected neither.

When the B-EMF waveform is detected, the B-EMF detection signal 40 outputted by the comparator 31 turns to a signal in which only "L" or "H" output level is continuous (step S1). Accordingly, the sensorless drive arithmetic operation circuit 9 calculates the revolution number of the three-phase brushless motor 21 to be 53 rpm or less (step S2). Consequently, it is determined that the revolution number in step S3 is 53 rpm or less and the rotation (PWM output of each phase) of the three-phase brushless motor 21 is stopped in step S4.

Figure 5:
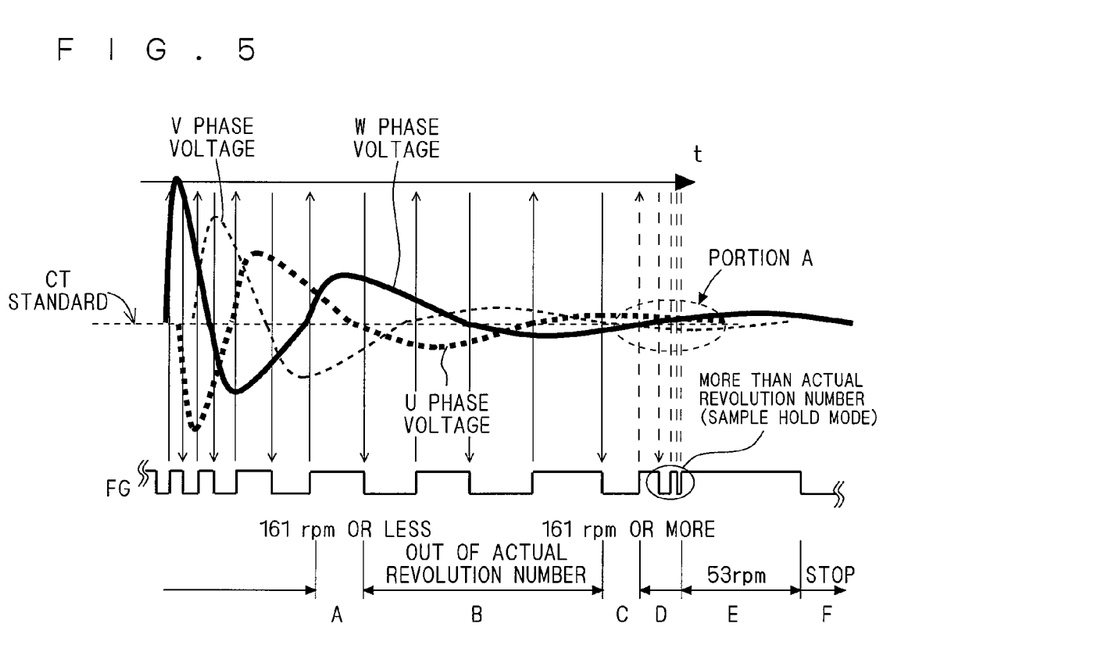
FIG. 5 is a diagram showing B-EMF waveform after filtering and corresponding rotation signal when the offset is not set.

FIG. 5 is a diagram showing an example of the rotation signal FG obtained when no offset is set. FIG. 5 shows the same B-EMF waveform as in FIG. 4 and the rotation signal FG obtained based on the B-EMF waveform.

Although as shown in FIG. 5, the areas A to C of the rotation signal FG are the same as in FIG. 4, in the area D following the area C, a voltage ripple left in the B-EMF after the B-EMF is passed through the CR filter by self-oscillation is detected by the comparator 31 and the B-EMF detection signal 40 based on the false detection is outputted. Thus, a pulse waveform indicating that the revolution number is higher than the actual revolution number is indicated in the area D.

Figure 6:
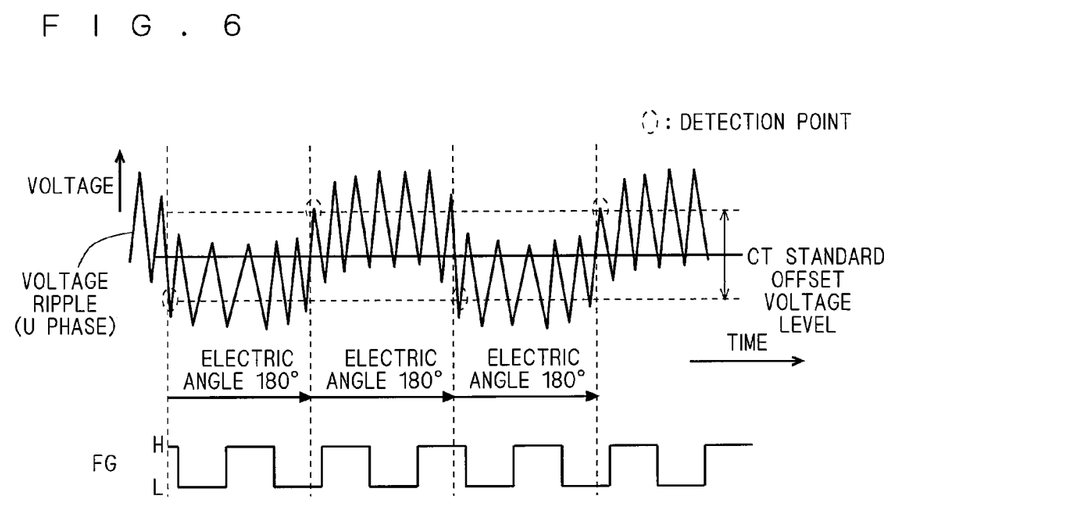
FIG. 6 is a partially enlarged diagram showing the B-EMF waveform after filtering and corresponding rotation signal when the offset is set.
Figure 7:
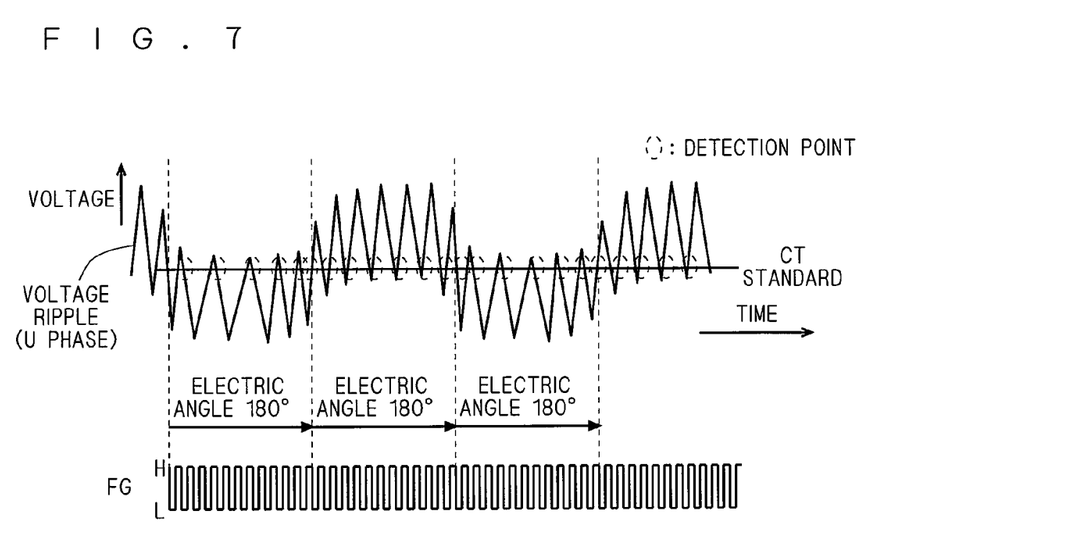
FIG. 7 is a partially enlarged diagram showing the B-EMF waveform after filtering and corresponding rotation signal when the offset is not set.

To clearly indicate a difference between a case where the offset is set and a case where no offset is set, an enlarged diagram of the portion A of FIG. 4 is shown in FIG. 6 and an enlarged diagram of the portion A in FIG. 5 is shown in FIG. 7.

FIG. 6 and FIG. 7 show the B-EMF waveform of the U phase, indicating a condition in which the voltage ripple is superimposed on the B-EMF after the B-EMF is passed through the CR filter.

If the offset is set and a point where a substantially equal voltage ripple as the offset voltage is detected is assumed as detection point and the polarity of the offset voltage is switched each time when the voltage ripple is detected. This processing is executed in the V phase and W phase and the rotation signal FG is calculated based on the detection point about the three phase B-EMF waveform.

On the other hand, if no offset is set, the center tap voltage CT is compared with the B-EMF waveform as shown in FIG. 7. A point where a substantially equal voltage ripple as the center tap voltage CT is detected is assumed to be detection point and the number of detections is enormous. This point is detected about V phase and W phase and if the rotation signal FG is calculated based on the obtained detection point, the rotation signal FG indicates a larger revolution number than the actual revolution number.

<Effect>

As described above, if the revolution number of the three-phase brushless motor 21 exceeds a predetermined threshold value, the comparison voltage of the comparator 31 is changed form the CT standard to the offset voltage and if the revolution number of the three-phase brushless motor 21 is the threshold value or less, the offset voltage is released or the comparison voltage is kept to the CT standard. With this configuration, the comparator 31 is prevented from detecting the voltage ripple left in the B-EMF after the B-EMF is passed through the CR filter (FIG. 6). As a result, despite the actual low revolution number of the three-phase brushless motor 21, it is mistakenly detected that the three-phase brushless motor 21 is rotating at a revolution number higher than actually (FIG. 7), thereby preventing any mistaken rotation signal FG from being outputted.

A signal selected by the signal switching portion 32 and the center tap voltage CT (or CT1) switchably provided to the + terminal and – terminal of the comparator 31 by the polarity switching portion 33. If the offset is set in the comparator 31, the polarity of the offset voltage can be switched each time when the edge of the rotation signal FG is detected.

If the polarity of the offset voltage is found on only one side without employing such the above structure, a large difference occurs between the width of pulse wave of the rotation signal FG and pulse interval. Consequently, it is mistakenly detected as if an unevenness is generated in the revolution number of the three-phase brushless motor 21. However, such mistaken detection can be prevented by switching the polarity of the offset voltage.

<First Modification>

In the comparison circuit 3 of the motor driving device described with reference to FIG. 1, the polarity switching portion 33 is connected to the + terminal and – terminal of the comparator 31. By switching a signal to be provided to the + terminal and – terminal of the comparator 31, the polarity of the offset of the comparator 31 is switched. However, it may be structured to have a function of switching the polarity of the offset of the comparator 31.

Figure 8:
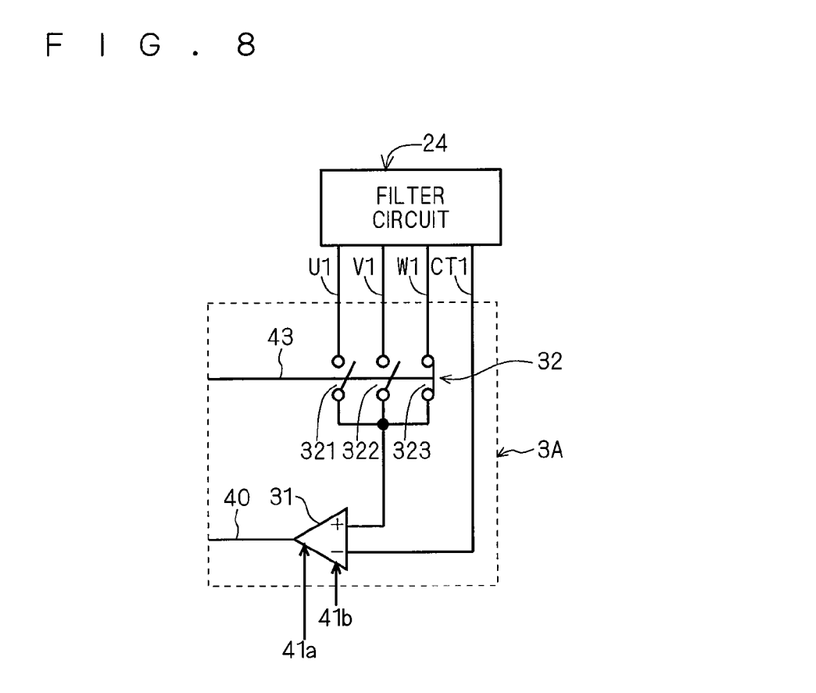
FIG. 8 is a diagram showing the structure of a first modification of a comparison circuit.

FIG. 8 shows a structure of a comparison circuit 3A provided with the comparator 31 having a function of switching the polarity of the offset.

The + terminal of the comparator 31 is connected to switches 321, 322, and 323 of the signal switching portion 32 commonly and an end of the comparator 31 is supplied with the center tap voltage CT or the center tap voltage CT1 after filtering.

Then, the comparator 31 is supplied with an offset signal 41a for setting the offset on the + terminal and an offset signal 41b for setting the offset on the –side by the counter 10 (not shown) (FIG. 1). The polarity of the offset is switched based on the offset signals 41a and 41b.

By adopting such a structure, the necessity of the polarity switching portion 33 (FIG. 1) is eliminated and consequently, a comparison circuit having a simplified structure can be obtained.

<Second Modification>

Although the comparison circuit 3 of the motor driving device 100 described with reference to FIG. 1 is structured to detect the three-phase B-EMF using the comparator 31, the comparators may be provided individually for each phase.

Figure 9:
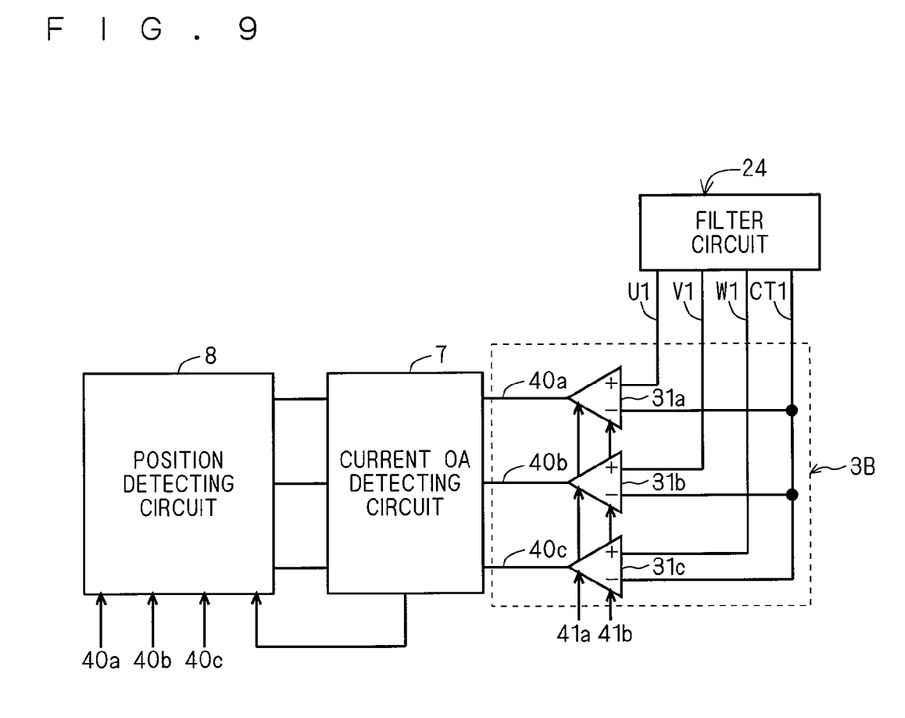
FIG. 9 is a diagram showing the structure of a second modification of the comparison circuit.

FIG. 9 shows the structure of a comparison circuit 3B having comparators 31a, 31b, and 31c corresponding to each phase of the B-EMF.

The + terminal of the comparator 31a is supplied with the back electromotive force U or the back electromotive force U1 after filtering and the – terminal of the comparator 31a is supplied with the center tap voltage CT or the center tap voltage CT1 after filtering.

The + terminal of the comparator 31b is supplied with the back electromotive force V or the back electromotive force V1 after filtering and the – terminal of the comparator 31b is supplied with the center tap voltage CT or the center tap voltage CT1 after filtering.

The + terminal of the comparator 31c is supplied with the back electromotive force W or the back electromotive force W1 after filtering and the – terminal of the comparator 31c is supplied with the center tap voltage CT or the center tap voltage CT1 after filtering.

The comparators 31a, 31b, and 31c are supplied with an offset signal 41a for setting the offset on the + side and an offset signal 41b for setting the offset on the – side by the counter 10 (FIG. 1). Consequently, the polarity of the offset is switched based on the offset signals 41a and 41b.

B-EMF detection signals 40a, 40b, and 40c are outputted from the comparators 31a, 31b, and 31c and provided to the current zero ampere detection circuit 7 and the position detecting circuit 8.

With such a structure, the necessity of the signal switching portion 32 (FIG. 1) and the polarity switching portion 33 (FIG. 1) can be eliminated, thereby obtaining a further simplified comparison circuit.

<Third Modification>

Figure 10:
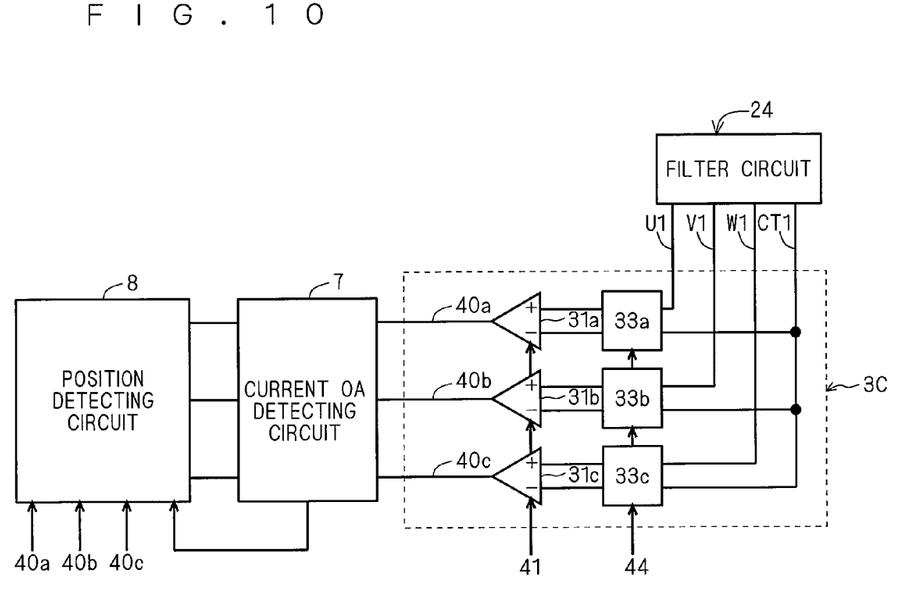
FIG. 10 is a diagram showing the structure of a third modification of the comparison circuit.

As the structure which uses the comparators for each phase, it may be structured to adopt a structure of the comparison circuit 3C shown in FIG. 10.

In FIG. 10, an input of the comparators 31, 31b, and 31c is respectively supplied through the polarity switching portions 33a, 33b, and 33c. The structure of the polarity switching portions 33a to 33c is the same as that of the polarity switching portion 33 described with reference to FIG. 1. The polarity switching portion 33a is supplied with the back electromotive force U or the back electromotive force U1 after filtering and the center tap voltage CT or the center tap voltage CT1 after filtering. The polarity switching portion 33b is supplied with the back electromotive force V or the back electromotive force V1 after filtering and the center tap voltage CT or the center tap voltage CT1 after filtering. The polarity switching portion 33c is supplied with the back electromotive force W or the back electromotive force W1 after filtering while – terminal thereof is supplied with the center tap voltage CT or the center tap voltage CT1 after filtering.

The polarity switching portions 33a to 33c switch an inputted signal based on the control signal 44 given from the sensorless drive arithmetic operation circuit 9 (FIG. 1) and provide the resultant signal to the + terminal and – terminal of the comparators 31a to 31c.

The comparators 31a-31c have the same structure as the comparator 31 described with reference to FIG. 1 so as to enable setting and release of the offset having a predetermined voltage value set preliminarily. The setting and release of the offset are controlled by the offset signal 41 given from the counter 10 (FIG. 1) incorporated in the sensorless drive arithmetic operation circuit 9 (FIG. 1). Other structure is the same as the comparison circuit 3B shown in FIG. 9.

By adopting such a structure, the necessity of the signal switching portion 32 (FIG. 1) can be eliminated, thereby a comparison circuit having a simplified structure can be obtained.

While the invention has been shown and described in detail, the foregoing description is in all aspects illustrative and not restrictive. It is therefore understood that numerous modifications and variations can be devised without departing from the scope of the invention.

What is claimed is:

1. A motor driving device for driving a three-phase brushless motor without using a hall sensor, comprising:
    a filter circuit which receives coil terminal voltages of each phase of the three phase coils of said three-phase brushless motor and a center tap voltage of said three-phase coil so as to remove a voltage component resulting from a current ripple included therein; and
    a voltage comparing portion including a comparator which compares a coil terminal voltage of each phase after filtering the coil terminal voltage of said each phase with a center tap voltage after filtering of said center tap voltage, wherein
    said comparator sets a comparison voltage with said coil terminal voltage of each phase after filtering based on an offset signal to a value supplied with a higher offset voltage than said ripple voltage after filtering.

2. The motor driving device according to claim 1, wherein said offset signal changes said comparison voltage to the value supplied with said offset voltage when a revolution number of said three-phase brushless motor exceeds a predetermined threshold value, and releases said offset voltage when the revolution number of said three-phase brushless motor is said threshold value or less.

3. The motor driving device according to claim 2, wherein said filter circuit is so switchably structured as to select which to output said coil terminal voltage of each phase after filtering and said center tap voltage after filtering or output said coil terminal voltage of each phase and said center tap voltage as they are, and said voltage comparing portion includes:

a polarity switching portion which switches a polarity of said comparator by switching a signal to be provided to a plus terminal and a minus terminal of said comparator; and a signal switching portion which switches said coil terminal voltage of each phase to be outputted from said filter circuit or said coil terminal voltage of each phase after filtering individually for each phase and provides the switched coil terminal voltage to said polarity switching portion.

4. The motor driving device according to claim 3, further comprising:

a position detecting portion which detects a zero cross point of voltage of position detection phase based on a comparison result by said voltage comparing portion and outputs a position detection signal; and a drive signal generating circuit which generates a PWM signal for driving said three-phase brushless motor based on a detection result of said position detecting circuit and generates and outputs a pulse-like rotation signal based on said position detection signal, wherein said drive signal generating circuit outputs a first control signal for switching the polarity of said comparator each time when an edge of said rotation signal is detected, and outputs a second control signal for controlling said signal switching portion so as to execute the switching operation at a timing after the edge of said rotation signal is detected.

* * * * *